United States Patent
Press

[11] Patent Number: 6,161,783
[45] Date of Patent: Dec. 19, 2000

[54] GASEOUS FUEL INJECTOR

[75] Inventor: Roman Press, Rochester, N.Y.

[73] Assignee: Impco Technologies, Inc., Cerritos, Calif.

[21] Appl. No.: 09/397,726

[22] Filed: Sep. 17, 1999

[51] Int. Cl.[7] ................................................. F02M 51/00
[52] U.S. Cl. ......................................................... 239/585.3
[58] Field of Search ............................. 239/585.1, 585.3; 251/129.16, 129.21

[56] References Cited

U.S. PATENT DOCUMENTS

| | | |
|---|---|---|
| 3,464,668 | 9/1969 | Jacob . |
| 4,390,130 | 6/1983 | Linssen et al. . |
| 4,655,396 | 4/1987 | Taxon et al. . |
| 4,958,774 | 9/1990 | Taylor .................................. 239/585.3 |
| 5,082,184 | 1/1992 | Stettner et al. ................... 239/585.3 X |
| 5,163,623 | 11/1992 | Seino ................................... 239/585.3 |
| 5,178,332 | 1/1993 | Tsukakoshi et al. ............. 239/585.3 X |
| 5,312,050 | 5/1994 | Schumann et al. ............... 239/585.3 X |
| 5,348,233 | 9/1994 | Press . |
| 5,494,223 | 2/1996 | Hall et al. . |
| 5,775,590 | 7/1998 | Smith et al. . |

*Primary Examiner*—Lesley D. Morris
*Attorney, Agent, or Firm*—Edward A. Sokolski

[57] ABSTRACT

A gaseous fuel injector for an internal combustion engine or a propulsion system using fuel cells has an electromagnetic solenoid with a flat rectangular armature which seats against a seat member to form a valve. The valve is kept in a closed position by the differential between the fuel pressure on one side and the atmospheric pressure or the ambient pressure in the discharge chamber on the other side with additional closing force being provided by a spring which abuts against the armature. With each pulsating actuation of the coil of the solenoid, the armature is driven away from its seat to open the valve formed thereby providing an injection of gas from the injector. The injector has a discharge nozzle which is integrally formed therewith. A centrally located aperture is formed in the armature which along with the side space afforded by the rectangular shape of the armature provides dual apertures for the flow of gas through the injector.

7 Claims, 2 Drawing Sheets

GASEOUS FUEL INJECTOR

BACKGROUND OF THE INVENTION

1. Field of the Invention

This invention relates to gaseous fuel injectors for propulsion systems and more particularly to such an injector which utilizes an electromagnetic solenoid with a flat armature which forms a valve for the injector.

2. Description of the Related Art

Gaseous fuel injection systems are commonly used in supplying fuel to engines. Such systems generally utilize a spherical ball type valve which is attached to a pintle which moves in the central portion of the solenoid. A typical such prior art fuel injector is described in U.S. Pat. No. 5,775,599 issued Jul. 7, 1998 to Smith et al. and assigned to Impco Technologies Inc., the assignee of the present application. For such systems to operate effectively, the fuel must provide enough lubrication to prevent a seizure of the plunger during its operation. With liquid fuel such lubrication is readily provided but with gaseous fuel, traces of compressor oil must be relied on. With the demand to increase the purity of gaseous fuel, compressors which do not use oil as a lubricant are now being extensively used, eliminating the entry of this lubricant into the fuel. The elimination of the lubricant, however, has resulted in the deterioration of the performance of typical prior art gaseous injectors.

To solve this problem, a gaseous fuel injector having a flat solenoid armature which seats directly on a seat member to form the fuel valve has been developed. This device is described in U.S. Pat. No. 5,348,233 issued Sep. 20, 1994 to Roman Press, et al., said Roman Press being the inventor of the present invention. This prior invention, while solving the problem of wear on the valve mechanism, has the shortcoming of having a discharge nozzle which is not integrated with the injector and thus is not readily amenable to mass production. Further, the device of this prior art invention is adapted for fuel delivery to its central portion, not from the top, as in the present invention. In addition, the device of this prior invention is not designed for installation between a fuel rail and an injector port in a manner similar to a gasoline injector, as is the device of the present invention.

SUMMARY OF THE INVENTION

The device of the present invention overcomes the aforementioned shortcomings of the prior art by utilizing a gaseous fuel injector which is adapted to feed fuel from a fuel rail to an injector port in the same general manner as a gasoline injector. The device employs a solenoid mounted within a housing. The solenoid has a rectangular armature with a flat surface which in its "normal" or closed position abuts against a seat member to form a fluid valve. The armature is retained in this closed position by the pressure differential between the gas pressure and atmospheric pressure in conjunction with the force provided by a spring. When the solenoid is actuated by injection control pulses, the valve is opened in response to such pulses to permit pulses of gas to be injected from the injector. The armature has an aperture in its central portion to enable increased fluid flow and to reduce the force required to drive the armature. Also, the rectangular configuration of the armature affords additional fluid flow along the sides of the armature. Fuel is fed into the injector at one end thereof and out through the other end. When electrical pulses corresponding to the desired fuel injection are fed to the solenoid coil, the armature is correspondingly actuated to provide injection of fuel out from the injector.

It is therefore an object of this invention to provide an improved gaseous fuel injector in which the operational life of the components is substantially increased.

It is a further object of this invention to improve the efficiency of operation of a gaseous fuel injector.

Other objects of the invention will become apparent in view of the following description taken in connection with the accompanying drawings.

DETAILED DESCRIPTION OF THE INVENTION

Referring now to the FIGS, a preferred embodiment of the invention is illustrated.

Figure 1:
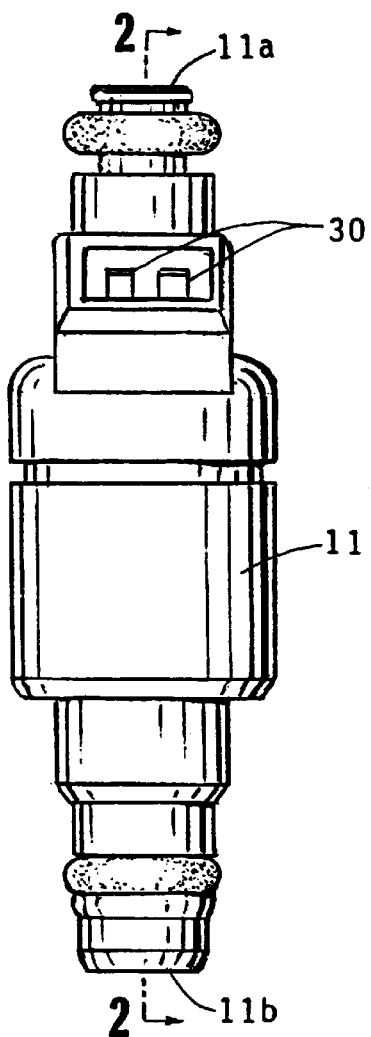
FIG. 1 is a side elevational view of a preferred embodiment of the invention.
Figure 2:
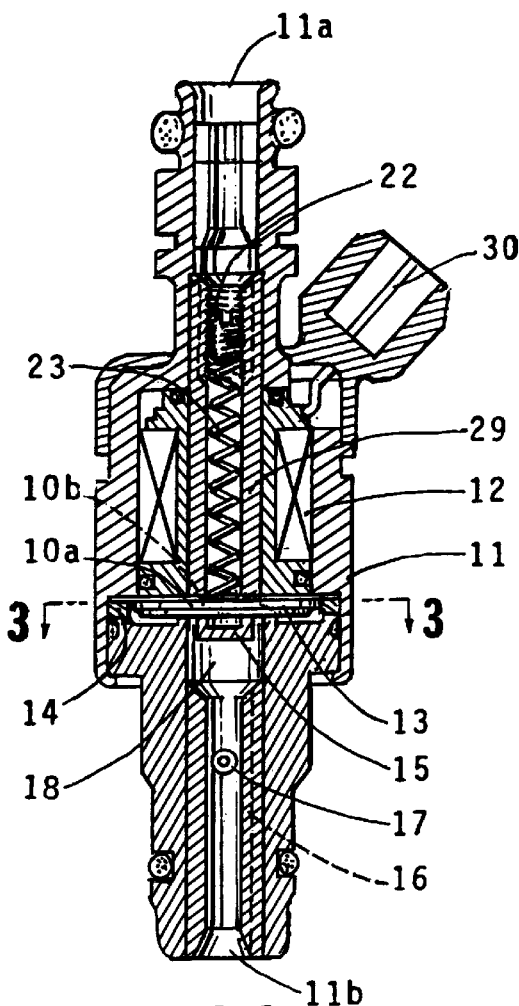
FIG. 2 is a cross sectional view taken along the plane indicated by 2—2 in FIG. 1.
Figure 3:
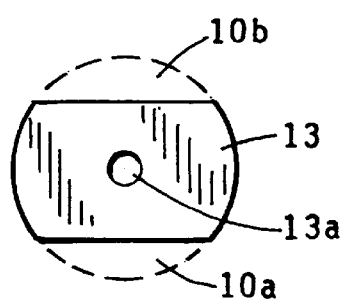
FIG. 3 is a cross sectional view taken along the plane indicated by 3—3 in FIG. 1.
Figure 6:
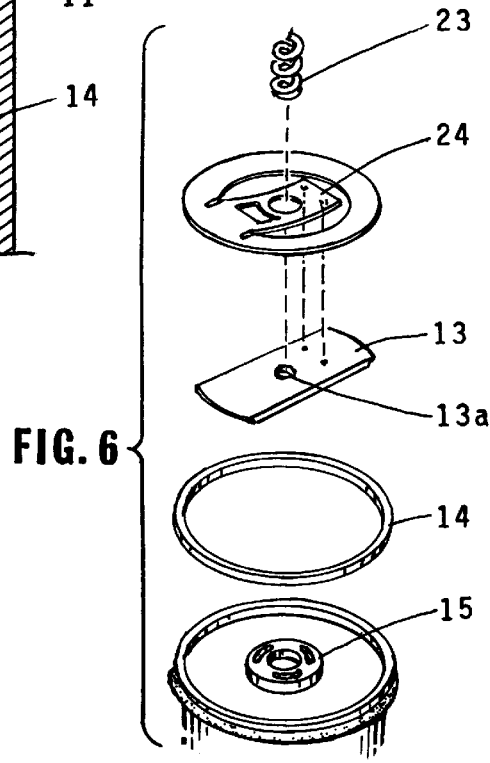
FIG 6 is an exploded perspective view of the fluid valve of the preferred embodiment.

The injector has a housing 11 in which the components are mounted. An electromagnetic solenoid having a driving coil 12 and an armature 13 is mounted within the housing. Armature 13, as best can be seen in FIGS. 3 and 6, has a generally rectangular configuration with a central aperture 13a. Aperture 13a and side spaces 10a and 10b located between the sides of the armature and spacer ring 14 provide openings for gaseous flow discharge. The armature 13 is welded to leaf spring 24, as indicated by the right hand pair of dashed lines in FIG. 6. This assures repeatable positioning of the armature relative to spacer ring 14 and valve seat 15. Gaseous fuel is fed into an opening in the central magnetic pole 29 through inlet 11a and exited from the housing through outlet 11b.

Spring 23 abuts against the armature, the tension of the spring being adjustable by means of adjustment screw 22. Electrical control signals for controlling the solenoid and thus the injection are fed in through electrical terminals 30 and from these terminals to the solenoid coil 12. Central cylindrical magnetic pole piece 29 has an aperture 21 formed therein for providing additional fuel flow discharge. Noise abatement is provided by means of a resonant chamber 18 and channel 16. The flow of gas from the injector is adjustable by means of control valve 17.

The height of control spacer 14 is chosen to provide the desired travel of the armature by fixing the distance between central pole 29 and valve seat 15, thus determining the fuel flow from the injector.

Figure 5:
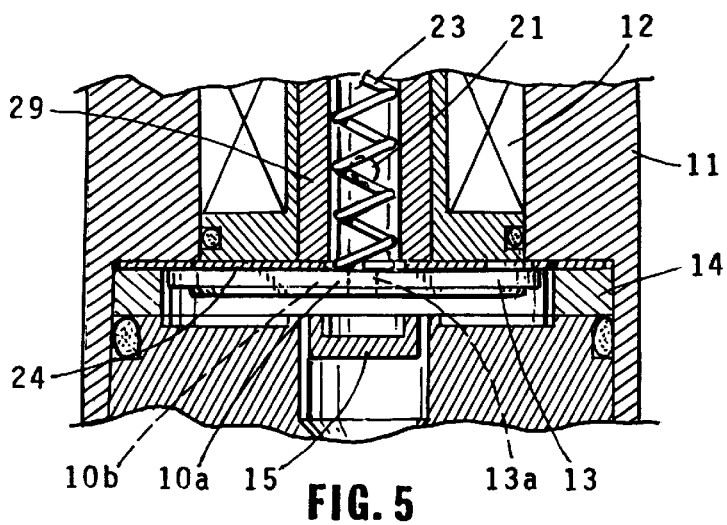
FIG. 5 is a cross sectional view showing the fluid valve of the preferred embodiment in an open position.

When an injection control signal is fed to coil 12, armature 13 is drawn upwardly countering the action of spring 23 and the differential pressures on the opposite sides of the armature and the action of spring 23. The armature is driven against the stop provided in the housing to open the valve by drawing the armature away from valve seat 15 thereby permitting gas to flow through the injector, as shown in FIG. 5.

Figure 4:
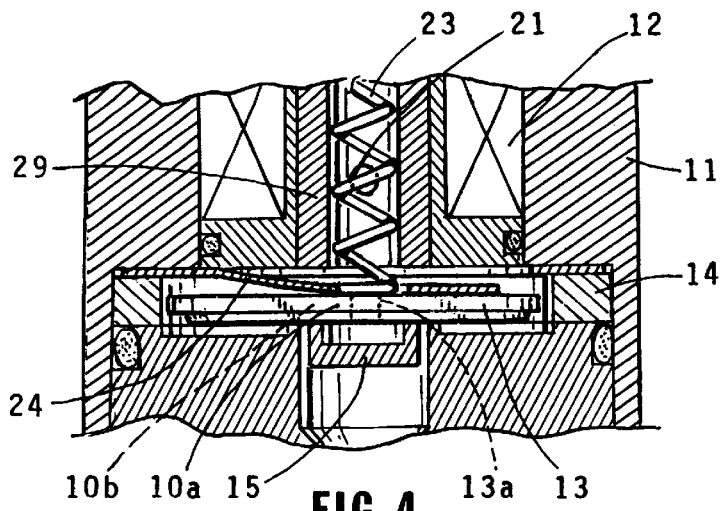
FIG. 4 is a cross sectional view showing the fluid valve of the preferred embodiment in a closed position.

In the absence of a control signal, the armature valve is kept in its closed position by virtue of the action of coil spring 23 and leaf spring 24 with the armature in abutment against valve seat 15, as shown in FIG. 4

It is to be noted that while the device of the invention has been described for use in feeding fuel to an engine, it can also be used for other applications requiring the injection of gaseous fuel such as, for example, in propulsion systems using fuel cells.

While the invention has been described and illustrated in detail it is to be understand that this is intended by way of illustration and example only, the scope of the invention being limited by the terms of the following claims.

I claim:

1. A gaseous fuel injector for use in feeding gaseous fuel to a propulsion system comprising:

a housing;

an electrically controlled injector having an armature and a solenoid coil mounted in said housing;

said armature being generally rectangular and having a substantially flat surface;

a single valve seat member;

the flat surface of said armature being in opposing substantially parallel relationship with said valve seat member;

means for urging said armature to bring the flat surface thereof in abutment against the valve seat member to provide a closed valve position;

a single outlet passage formed in said housing gaseous fuel being fed into one end of said housing and exited through said single outlet passage located at the opposite end thereof; and means for feeding control pulses to said solenoid coil to drive said armature away from said valve seat member to an open position thereby opening the valve formed thereby to permit gaseous fuel to exit from said housing through said single outlet passage.

2. The fuel injector of claim 1 wherein said means for urging said armature against said valve seat member comprises a differential gas pressures on opposite sides of said armature in conjunction with a spring.

3. The fuel injector of claim 1 wherein said armature has a second flat surface opposite the flat surface in opposing relationship with the valve seat member and further including a leaf spring attached to said second flat surface for resiliently urging said armature towards the valve seat member.

4. The fuel injector of claim 1 and further including a spacer ring mounted in said housing, said spacer having a predetermined height which determines the travel distance of said armature between its open and closed positions.

5. The fuel injector of claim 1 wherein said armature has an aperture formed therein for passing additional fuel therethrough when said armature is in its open position.

6. The fuel injector of claim 1 wherein said injector is integrally formed and has an inlet at one end thereof for feeding gaseous fuel into said injector and an outlet at the opposite end thereof for feeding gaseous fuel out of said injector.

7. A gaseous fuel injector for use in feeding gaseous fuel to a propulsion system comprising:

a housing;

an electrically controlled injector having an armature and a solenoid coil mounted in said housing;

said armature being generally rectangular and having a substantially flat surface;

a valve seat member;

the flat surface of said armature being in opposing relationship with said valve seat member;

means for urging said armature to bring the flat surface thereof in abutment against the valve seat member to provide a closed valve position;

means within said housing for abating noise;

gaseous fuel being fed into one end of said housing and exited through the opposite end thereof; and means for feeding control pulses to said solenoid coil to drive said armature away from said valve seat member to an open position thereby opening the valve formed thereby to permit gaseous fuel to exit from said housing.

* * * * *